(12) United States Patent
Carns et al.

(10) Patent No.: US 7,493,911 B2
(45) Date of Patent: Feb. 24, 2009

(54) SHROUDED VALVE APPARATUS AND RELATED METHODS

(75) Inventors: James A. Carns, Wichita, KS (US); Theron L. Cutler, Wichita, KS (US); Mark A. Shelly, Bel Air, KS (US); Benjamin P. Van Kampen, Wichita, KS (US)

(73) Assignee: The Boeing Company, Chicago, IL (US)

( * ) Notice: Subject to any disclaimer, the term of this patent is extended or adjusted under 35 U.S.C. 154(b) by 273 days.

(21) Appl. No.: 11/150,853

(22) Filed: Jun. 10, 2005

(65) Prior Publication Data

US 2007/0051406 A1    Mar. 8, 2007

Related U.S. Application Data

(60) Continuation-in-part of application No. 10/988,309, filed on Nov. 13, 2004, which is a division of application No. 10/215,498, filed on Aug. 9, 2002, now Pat. No. 6,848,720.

(51) Int. Cl.
*F16K 23/00* (2006.01)
(52) U.S. Cl. .......................... 137/1; 137/312; 137/594; 244/135 R
(58) Field of Classification Search ................ 137/312, 137/594, 1; 244/135 R, 135 A, 135 C
See application file for complete search history.

(56) References Cited

U.S. PATENT DOCUMENTS

| 724,675 | A | | 4/1903 | Decker |
|---|---|---|---|---|
| 2,475,635 | A | | 7/1949 | Parsons |
| 2,649,769 | A | * | 8/1953 | Kaiser ........................ 137/594 |
| 2,668,066 | A | | 2/1954 | Stadelhofer |
| 3,747,618 | A | * | 7/1973 | Boes ............................ 137/80 |
| 3,928,903 | A | | 12/1975 | Richardson et al. |
| 3,976,100 | A | * | 8/1976 | Souslin .................. 244/135 A |
| 4,149,739 | A | | 4/1979 | Morris |
| 4,658,873 | A | * | 4/1987 | von Meyerinck et al. ..... 141/387 |
| 4,925,218 | A | | 5/1990 | Kunz et al. |
| 4,929,000 | A | | 5/1990 | Annestedt, Sr. |
| 5,228,472 | A | * | 7/1993 | Ougiya et al. ................ 137/312 |
| 5,449,203 | A | | 9/1995 | Sharp |
| 5,449,204 | A | | 9/1995 | Greene et al. |
| 5,546,977 | A | * | 8/1996 | Chaney ....................... 137/312 |
| 5,947,151 | A | * | 9/1999 | Shafer ........................ 137/375 |
| 6,302,448 | B1 | | 10/2001 | Van Der Meer et al. |
| 6,428,054 | B1 | | 8/2002 | Zappa et al. |
| 6,848,720 | B2 | | 2/2005 | Carns |
| 2004/0026922 | A1 | | 2/2004 | Carns et al. |

FOREIGN PATENT DOCUMENTS

| DE | 833152 C | 3/1952 |
|---|---|---|
| DE | 2774674 | 4/1979 |
| DE | 3436994 C1 | 2/1986 |
| DE | 10102398 A1 | 7/2002 |
| DE | 20209981 U1 | 11/2002 |
| EP | 1179505 A1 | 2/2002 |
| GB | 886 320 A | 1/1962 |
| GB | 1105353 A | 6/1968 |
| WO | WO 85/02003 | 5/1985 |

* cited by examiner

OTHER PUBLICATIONS

European Search Report Dated: Sep. 12, 2007 63 pages.

*Primary Examiner*—Kevin L Lee
(74) *Attorney, Agent, or Firm*—Harness, Dickey & Pierce, P.L.C.

(57) ABSTRACT

A shrouded valve apparatus including an outer conduit, an inner conduit disposed within the outer conduit, and a valve member operable to regulate flow through the inner conduit. This apparatus is useful in shrouded aircraft fuel systems.

19 Claims, 4 Drawing Sheets

SHROUDED VALVE APPARATUS AND RELATED METHODS

CROSS-REFERENCE TO RELATED APPLICATIONS

This application is a continuation-in-part (CIP) of pending U.S. patent application Ser. No. 10/988,309, filed on Nov. 13, 2004, the disclosure of which is incorporated herein by reference. The present application is generally related to subject matter disclosed in co-filed applications "Shrouded Body Flow Meter Assembly", U.S. Provisional Application No. 60/689,677, filed on Jun. 10, 2005, "Redundant Seal Fitting-Fluid Carrying Apparatus", U.S. Provisional Application No. 60/689,224 filed Jun. 9, 2005, "Ball Joint Assembly-Fluid Conducting Apparatus, Fully Articulating", U.S. Provisional Application No. 60/689,499 filed Jun. 10, 2005, and "Aerial Refueling System", U.S. Provisional Application No. 60/689,666, filed Jun. 10, 2005, all disclosures of which are hereby incorporated by reference into the present disclosure.

FIELD OF THE INVENTION

The present invention relates generally to fluid-conducting apparatus and more particularly to controlling flow through a shrouded fluid-conducting apparatus.

BACKGROUND OF THE INVENTION

In commercial aircraft, fuel lines (e.g., manifolds and conduits) conducting or transporting fuel through areas classified as "ignition zones" (e.g., pressurized areas) are required to be shrouded and drainable. A shrouded fluid-conducting apparatus adaptable for use in aircraft is described in pending U.S. patent application Ser. No. 10/988,309, a divisional of U.S. patent application Ser. No. 10/215,498, upon which was issued U.S. Pat. No. 6,848,720. The disclosures of the foregoing patent and patent applications are incorporated herein by reference in their entirety.

SUMMARY OF THE INVENTION

The present invention, in one configuration, is directed to a shrouded valve apparatus including an outer conduit, an inner conduit disposed within the outer conduit, and a valve member operable to regulate flow through the inner conduit.

BRIEF DESCRIPTION OF THE DRAWINGS

The present invention will be more fully understood from the detailed description and the accompanying drawings, wherein.

DETAILED DESCRIPTION OF EMBODIMENTS

Figure 1:
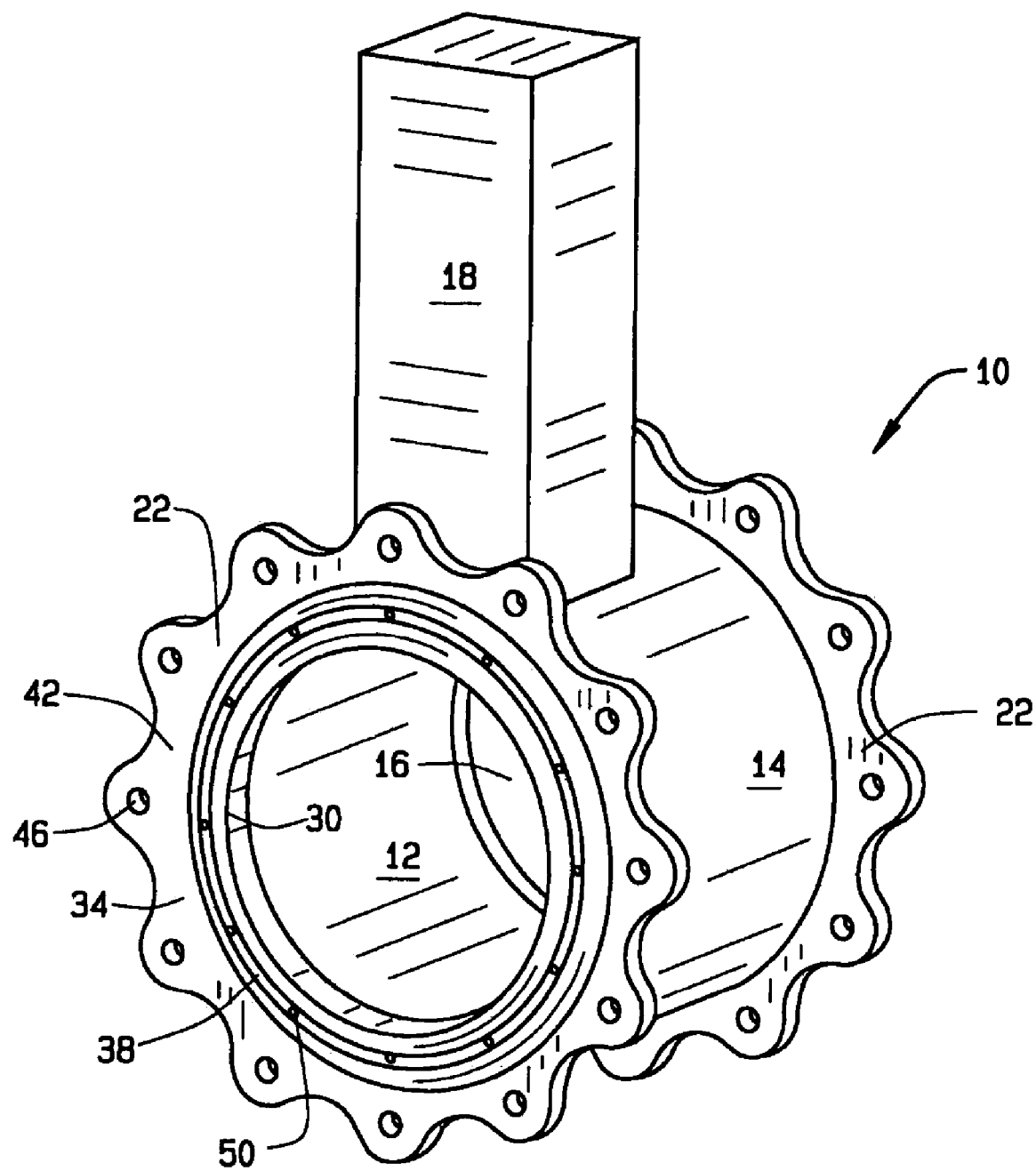
FIG. 1 is a perspective view of a shrouded valve apparatus in accordance with one implementation of the present invention.

The following description of various embodiments is merely exemplary in nature and is in no way intended to limit the invention, its application, or uses. For example, implementations of the invention are contemplated in connection with various types of aircraft (including but not limited to fighter jets, commercial aircraft, private jets and propeller powered airplanes) regardless of the manner in which the aircraft is piloted (e.g., directly, remotely, via automation, or in a combination thereof, among others). Furthermore, the present invention is not limited to aircraft. Accordingly, specific references to aircraft herein should not be construed as limiting the scope of the present invention. In addition, it is also anticipated that the invention will be applicable to any of a wide range of fluids, e.g., gases and liquids, regardless of whether the fluid is being used as a fuel. Accordingly, the specific references to fuel, gases, or liquids herein should not be construed as limiting the scope of the present invention.

Additionally, certain terms are used in this description for the purpose of reference only, and thus are not intended to be limiting. For example, terms such as "upper", "lower", "above", and "below" refer to directions in the drawings to which reference is made. Terms such as "front", "back", "rear", and "side" describe the orientation of portions of a component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

An exemplary shrouded valve apparatus is indicated generally in FIG. 1 by reference number 10. The apparatus 10 includes an inner conduit 12 disposed within an outer conduit 14. The inner conduit 12 includes a lumen 16 that allows for a fluid flow (e.g., flow of gases and/or liquids) through the inner conduit 12. As further described below, a valve actuator 18 is operable to activate a valve member (not shown in FIG. 1) disposed in the inner conduit 12, to regulate flow through the inner conduit 12. The outer conduit 14 and actuator 18 cooperate to shroud the inner conduit 12, to contain in the outer conduit 14 any fluid leaking from the inner conduit 12. Thus, for example, any fluid that might leak from the inner conduit 12 is prevented from reaching a compartment in which the shrouded valve apparatus 10 is being used.

The apparatus 10 includes one or more shrouded end fittings 22. An end fitting 22 may be used to connect the shrouded valve apparatus 10, for example, with a shrouded fluid-conducting apparatus as further described below. Alternatively, the shrouded valve apparatus 10 may be connected by way of the shrouded end fittings 22 to any one of a wide range of other fluid-conducting apparatus having end fittings mateable or engageable with the shrouded end fittings 22, as would be obvious to one having ordinary skill in the art after having become familiar with the teaching of the present invention. The shrouded end fittings 22 may be used to hold or keep the inner conduit 12 substantially stationary with respect to the outer conduit 14 and/or to transfer loads from the inner and outer conduits 12 and 14 to an external component (e.g., ceiling joists, floor beams, and other load-bearing structures).

The shrouded end fitting 22 includes an inner portion 30 and an outer portion 34 that are separated by a spaced distance 38. The outer portion 34 may include a flange 42 that defines a plurality of holes 46 sized to receive the mechanical fasteners (not shown in FIG. 1) therethrough. The shrouded end fitting 22 may further include a plurality of spokes, webs, or fins 50 that are disposed between the inner and outer portions 30 and 34.

In some configurations, one or more of the fins 50 of the shrouded end fitting 22 may be configured for allowing installation of at least a portion or a component of a fluid control system therein. That is, one or more of the fins 50 may be sufficiently thick to allow a passageway to be provided therethrough, which may be used for installation of a union or pipe coupling, a drain, a pressure regulator, and/or other components of a fluid control system. Reference is made to methods and apparatus described in Carns, et al., U.S. Pat. No. 6,848,720 and U.S. application Ser. No. 10/988,309, assigned to the assignee hereof and the disclosure of which are incorporated herein by reference.

Any of a wide range of materials and manufacturing processes may be used to produce the shrouded end fittings 22. The selection of material may depend at least in part on the materials comprising the inner and outer conduits 12 and 14 and the manner in which the inner and outer conduits 12 and 14 will be engaged with the shrouded end fittings 22. The selection of manufacturing process may depend at least in part on the material that is selected for the shrouded end fittings 22. By way of example only, the shrouded end fittings 22 may include aluminum (e.g., 6061-T4 aluminum) and/or stainless steel and may be formed by a machining and/or milling process.

It should be noted that other shrouded end fittings could be used in connection with the valve apparatus 10. In some embodiments, a flexible joint may be used to connect a shrouded valve apparatus with another component, in the same or similar manner as described in Carns, et al., U.S. Pat. No. 6,848,720 and U.S. application Ser. No. 10/988,309, assigned to the assignee hereof and the disclosure of which are incorporated herein by reference.

Figure 2:
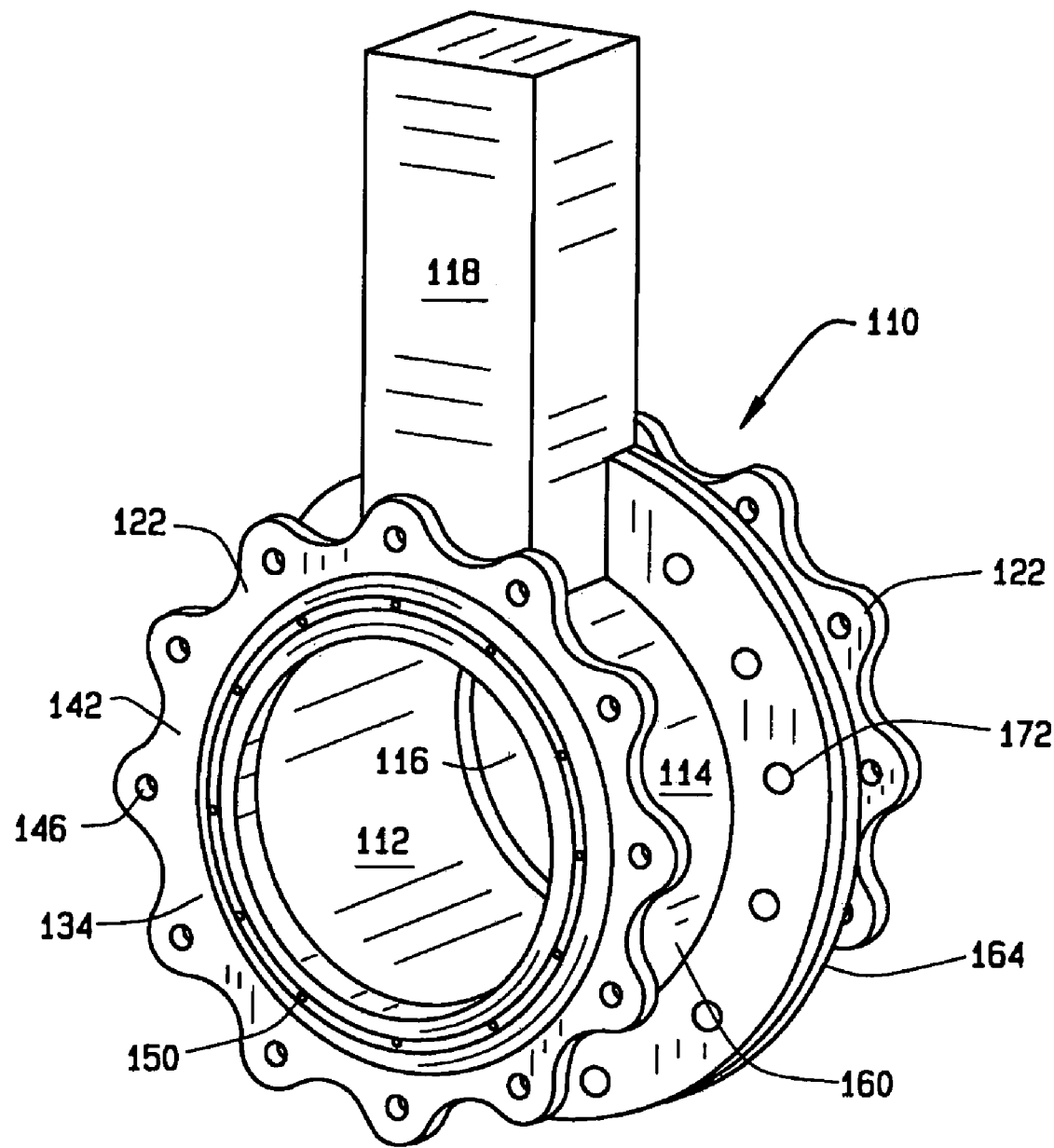
FIG. 2 is a perspective view of a shrouded valve apparatus in accordance with one implementation of the present invention.

Another exemplary shrouded valve apparatus is indicated generally in FIG. 2 by reference number 110. The apparatus 110 includes an inner conduit 112 disposed within an outer conduit 114. The inner conduit 112 includes a lumen 116 that allows for a fluid flow (e.g., flow of gases and/or liquids) through the inner conduit 112. As further described below, a valve actuator 118 is operable to activate a valve member (not shown in FIG. 1) disposed in the inner conduit 112, to regulate flow through the inner conduit 112. The outer conduit 114 and actuator 118 cooperate to shroud the inner conduit 112, to contain in the outer conduit 114 any fluid leaking from the inner conduit 112. The apparatus 110 includes one or more shrouded end fittings 122. An end fitting 122 may be used to connect the shrouded valve apparatus 110, for example, with a shrouded fluid-conducting apparatus as further described below. The valve apparatus 110 is fabricated by joining two parts 160 and 164 together to form a flange 168. For example, the parts 160 and 164 may be bolted or screwed together at holes 172.

Figure 3:
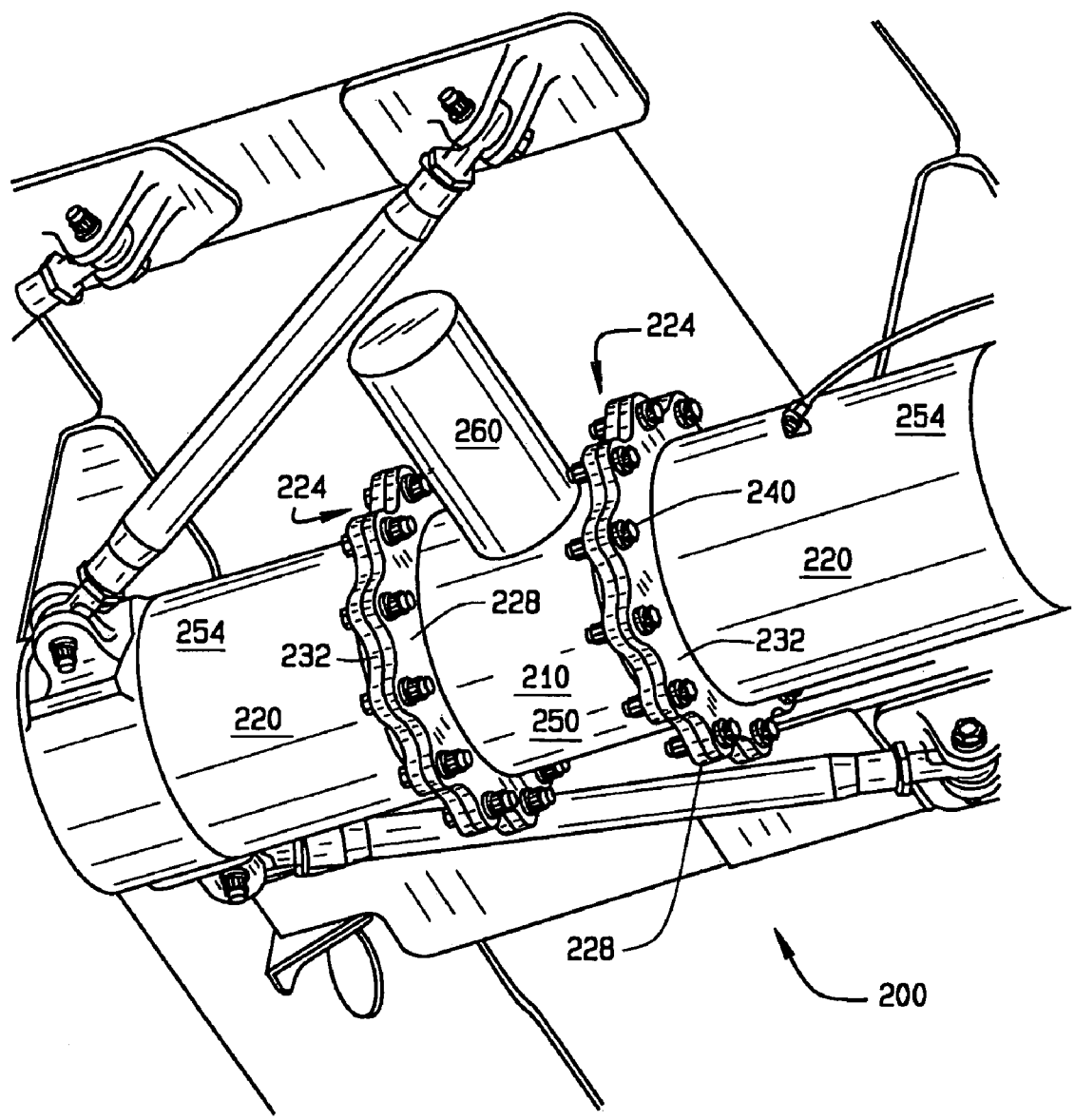
FIG. 3 is a perspective view of a shrouded valve apparatus connected between two shrouded fluid-conducting apparatus in accordance with one embodiment of the invention.

A bottom perspective view of a shrouded valve apparatus in use is indicated generally in FIG. 3 by reference number 200. A shrouded valve apparatus 210 is connected between two fluid-conducting apparatus 220 at joints 224. Accordingly, the valve apparatus 210 includes shrouded end fittings 228 disposed at its ends, which may be engaged with shrouded end fittings 232 of the two fluid-conducting apparatus 220 by mechanical fasteners 240 (e.g., lugs, clevis pins, single pin joints, screws, and/or rivets). The shrouded fittings 228 and 232 may be configured, for example, as previously described with reference to FIG. 1. The shrouded fittings 228 and 232 provide fluid communication between inner conduits (not shown in FIG. 3) of the valve apparatus 210 and the fluid-conducting apparatus 220. The fittings 228 and 232 also provide fluid communication between outer conduits 250 and 254 of the valve apparatus 210 and the fluid-conducting apparatus 220. The valve apparatus 210 also includes a valve actuator 260 further described below.

In the present embodiment, a joint 224 is a substantially fixed joint that allows for the transfer of loads from one shrouded apparatus 210 or 220 to another shrouded apparatus and/or to an external component (e.g., ceiling joist, floor beam, other load-bearing structures, etc.). As previously mentioned with reference to FIG. 1, joints more flexible than joints 224 could be used in other configurations.

Figure 4:
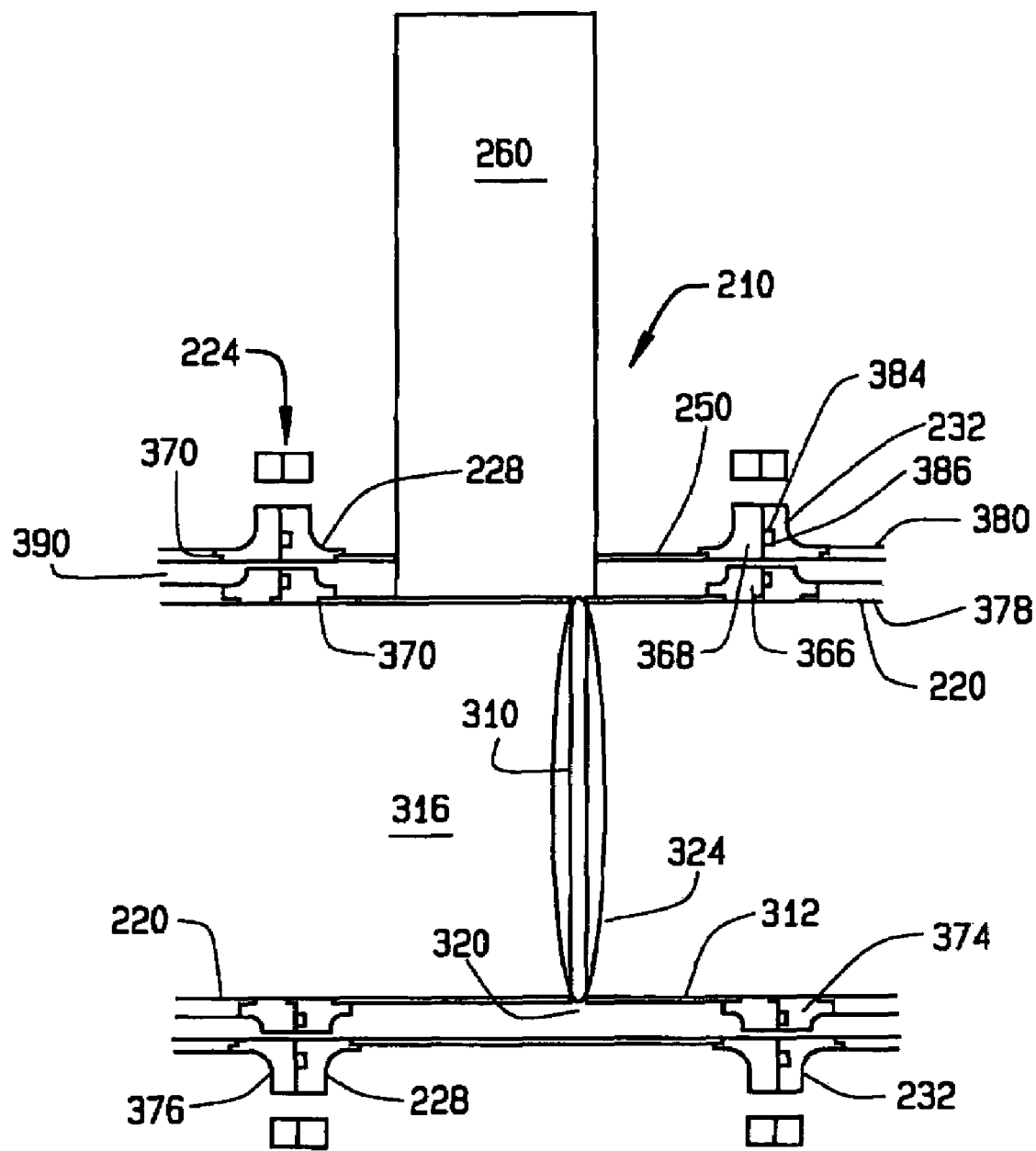
FIG. 4 is a cross-sectional view of a shrouded valve apparatus connected between two shrouded fluid-conducting apparatus in accordance with one embodiment of the invention.

FIG. 4 is a cross-sectional side view of the shrouded valve apparatus shown in FIG. 3. The apparatus 210 includes an inner conduit 312 defining an inner lumen 316. The actuator 260 may be electrically powered and may be, for example, an electric motor or a solenoid. In some configurations, the actuator may be mechanically powered. It can be appreciated that various types of actuators could be used in various configurations. In the present exemplary configuration the actuator 260 includes a motor that turns a shaft 310 extending into the inner lumen 316 and into a pivot location 320 in the inner conduit 312. A valve member 324, e.g., a butterfly, is fixedly mounted on the shaft 310. In the present embodiment the valve member 324 is round and flat. The actuator 260 is operable to rotate the shaft 310 and valve member 324 in the pivot location 320. The valve member 324 thus can be selectively positioned in the inner lumen 316 to regulate flow through the inner lumen. When, for example, the valve member completely obstructs the inner lumen, flow through the inner lumen 316 is stopped. In such manner, one portion of a fuel system in which the valve apparatus 210 is installed can be isolated from another portion. The valve member 324 can be positioned by the actuator 260 to provide various degrees of opening and/or closing of the inner lumen 316. In some other configurations, a valve member may have another shape, for example, to accommodate an inner lumen that is not round.

Inner and outer portions 366 and 368 of a valve apparatus shrouded end fitting 228 may be provided with notches or weld sockets 370 into which may be welded (e.g., fillet weld, butt weld, etc.) the inner and outer conduits 312 and 250, respectively. Inner and outer portions 374 and 376 of a shrouded end fitting 232 of an apparatus 220 may also be provided with notches or weld sockets 370 into which may be welded (e.g., fillet weld, butt weld, etc.) an inner conduit 378 and outer conduit 380, respectively, of that apparatus 220. Additionally, the inner and outer portions of the shrouded end fittings 228 and 232 may each define grooves (not shown) in which are disposed o-rings to assist with the fluidic sealing of the joints 224.

To ensure proper alignment of the shrouded end fittings 228 and 232, the shrouded end fittings 228 and 232 may be shaped to interfit with one another in a keyed arrangement. For example, as shown in FIG. 4, a shrouded end fitting 228 includes an alignment tab or key 384 that is sized to fit within a notch or keyway 386 defined by the shrouded end fitting 232. Or, for example, a shrouded end fitting 228 may, additionally or alternatively, include a radial protrusion (not shown) disposed to engage a chamfered or beveled surface defined by a shrouded end fitting 232. In other embodiments, a shrouded end fitting 228 may be provided with the alignment tab and/or the radial protrusion, and the shrouded end fitting 232 may be provided with the notch and/or the chamfered surface.

A joint 284 allows for fluid communication between the inner conduits 312 and 378 and also defines a leak detection passageway 390 that allows for fluid communication between the outer conduits 250 and 380. With the leak detection passageway 390, a leak detection system is not necessarily needed for each of the shrouded apparatus 210 and 220. Instead, a single leak detection system may be used to detect fluid in either of the outer conduits 250 or 380. The actuator 260 is affixed to the inner conduit 312 of the valve apparatus 210 in a manner that prevents fluid from crossing between the inner and outer conduits 312 and 250 but does not prevent fluid communication between portions of the outer conduit 250.

The foregoing shrouded valve apparatus can be used to regulate flow of fluid in aircraft fuel systems and to isolate one portion of the system from another. The valve may be closed to isolate a portion and opened to allow flow from one portion of the system to another. Of course, varying degrees of flow also can be achieved dependent on the position of the valve member relative to a inner conduit within the valve apparatus.

The description of the invention is merely exemplary in nature and, thus, variations that do not depart from the substance of the invention are intended to be within the scope of the invention. Such variations are not to be regarded as a departure from the spirit and scope of the invention.

What is claimed is:

1. A shrouded valve apparatus comprising:
   an outer conduit disposed between and terminating in two shrouded end fittings;
   an inner conduit disposed within the outer conduit and disposed between and terminating in the two end fittings; and
   a valve member operable to regulate flow through the inner conduit.

2. The shrouded valve apparatus of claim 1, further comprising an actuator for actuating the valve member, the actuator and outer conduit cooperating to shroud the inner conduit.

3. The shrouded valve apparatus of claim 1, wherein the valve member is selectively positionable in the inner conduit to regulate the flow.

4. The shrouded valve apparatus of claim 1, wherein one of the shrouded end fittings is configured to interfit with a shrouded end fitting of a fluid-conducting apparatus.

5. The shrouded valve apparatus of claim 4, wherein the valve member is operable to isolate one portion of a fuel system that includes the shrouded valve apparatus from another portion of the fuel system.

6. The shrouded valve apparatus of claim 4, wherein the shrouded end fittings allow for transfer of a load between the shrouded valve apparatus and the fluid-conducting apparatus.

7. The shrouded valve apparatus of claim 1, wherein the outer conduit is in fluid communication with outer conduits of a plurality of shrouded fluid conducting apparatus through the shrouded end fittings and the inner conduit is in fluid communication with inner conduits of the plurality of shrouded fluid conducting apparatus through the shrouded end fittings.

8. The shrouded valve apparatus of claim 1, further comprising an actuator for actuating the valve member, the actuator affixed to the inner conduit to prevent fluid from crossing between the inner and outer conduits while allowing fluid to pass through the outer conduit.

9. The shrouded valve apparatus of claim 1, wherein one of the shrouded end fittings is configured to provide a leak detection passageway between the outer conduit and an outer conduit of a fluid-conducting apparatus connected with the shrouded valve apparatus.

10. The shrouded valve apparatus of claim 4, wherein the one of the shrouded end fittings comprises an alignment device configured to engage an alignment device of the shrouded end fitting of the fluid-conducting apparatus to align the valve apparatus with the fluid-conducting apparatus.

11. A method of conducting fuel in an aircraft fuel system, comprising:
   conducting the fuel through a first conduit inside a second conduit; and
   regulating a flow rate of the fuel through the first conduit, the regulating performed by actuating a valve member disposed in the first conduit;
   wherein actuating a valve member comprises selectively rotating the valve member in the first conduit.

12. A method of conducting fuel in an aircraft fuel system, comprising:
   conducting the fuel through a first conduit inside a second conduit; and
   regulating a flow rate of the fuel through the first conduit, the regulating performed by actuating a valve member disposed in the first conduit;
   wherein conducting the fuel through the first conduit comprises conducting the fuel through a shrouded valve apparatus and at least one shrouded fluid-conducting apparatus connected with the valve apparatus.

13. A method of conducting fuel in an aircraft fuel system, comprising:
   conducting the fuel through a first conduit inside a second conduit;
   regulating a flow rate of the fuel through the first conduit, the regulating performed by actuating a valve member disposed in the first conduit; and
   connecting a shrouded end fitting of a shrouded valve apparatus with a shrouded end fitting of at least one shrouded fluid-conducting apparatus to form the conduits.

14. The method of claim 13, wherein connecting the end fittings comprises engaging a protrusion of one fitting with the other fitting.

15. The method of claim 13, wherein connecting the end fittings comprises engaging an alignment key of one of the end fittings in a keyway of the other end fitting to align the valve apparatus with the fluid-conducting apparatus.

16. The method of claim 13, wherein the connecting is performed to provide a leak detection passageway through the shrouded valve apparatus and fluid-conducting apparatus in the second conduit.

17. A method of conducting fuel in an aircraft fuel system, comprising:
   conducting the fuel through a first conduit inside a second conduit;
   regulating a flow rate of the fuel through the first conduit, the regulating performed by actuating a valve member disposed in the first conduit; and
   regulating the flow rate through the first conduit while allowing fluid flow through the second conduit.

18. A method of conducting fuel in an aircraft fuel system, comprising:
   conducting the fuel through a first conduit inside a second conduit;
   regulating a flow rate of the fuel through the first conduit, the regulating performed by actuating a valve member disposed in the first conduit; and
   actuating the valve member to isolate a portion of the fuel system from another portion of the fuel system.

19. A method of conducting fuel in an aircraft fuel system, comprising:
   conducting the fuel through a first conduit inside a second conduit;
   regulating a flow rate of the fuel through the first conduit, the regulating performed by actuating a valve member disposed in the first conduit; and actuating the valve member to provide one of a plurality of degrees of opening of the first conduit.

* * * * *